United States Patent [19]
Layton
[11] 3,759,917
[45] Sept. 18, 1973

[54] USE OF AN OPEN-BARREL SCREW PRESS DRYER FOR CHAIN-BRANCHING AN EPDM COPOLYMER

[75] Inventor: Lawrence Klinge Layton, Newark, Del.

[73] Assignee: E. I. du Pont de Nemours and Company, Wilmington, Del.

[22] Filed: Apr. 8, 1971

[21] Appl. No.: 132,290

[52] U.S. Cl. ......... 260/79.5 PR, 260/3, 260/79.5 B, 260/80.78, 260/889, 260/890
[51] Int. Cl. ............................................ C08f 15/40
[58] Field of Search ........................ 34/12; 260/94.9, 260/88.25, 80.78, 79.5 PR

[56] References Cited

UNITED STATES PATENTS

| | | | |
|---|---|---|---|
| 2,833,750 | 5/1958 | Vickers | 260/85.3 |
| 3,143,584 | 8/1964 | Roberts | 264/210 |
| 3,156,677 | 11/1964 | Resnick | 260/88.2 |
| 3,406,732 | 10/1968 | Milano | 152/330 |

OTHER PUBLICATIONS

Enclopedia of Polymer Science and Technology Vol. 4 Interscience Publ. Crosslinking - pages 337-340

*Primary Examiner*—Joseph L. Schofer
*Assistant Examiner*—Roger S. Benjamin
*Attorney*—Alanson G. Bowen, Jr.

[57] ABSTRACT

The use of the water-vaporizing section of an open-barrel screw press dryer for simultaneously drying and chain-branching a copolymer, said use consisting essentially of introducing said copolymer into one end of said dryer, introducing a promoter into said water-vaporizing section at one or more points on said barrel, and heating the resulting mixture while conveying the mixture through said water-vaporizing section, thereby forming a vulcanizable branched elastomeric polymer. The branched polymers are useful for improving the ozone resistance of blends with other elastomers.

13 Claims, 1 Drawing Figure

PATENTED SEP 18 1973
3,759,917
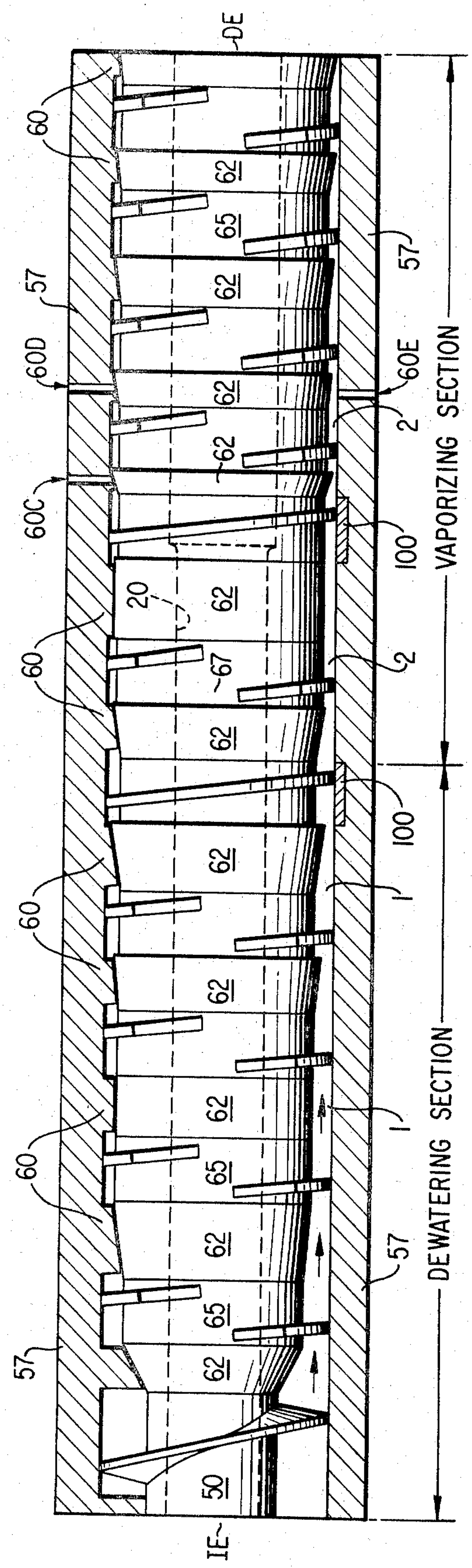
INVENTOR
LAWRENCE KLINGE LAYTON
BY Kenneth J. Meyer
AGENT

USE OF AN OPEN-BARREL SCREW PRESS DRYER FOR CHAIN-BRANCHING AN EPDM COPOLYMER

BACKGROUND OF THE INVENTION

This invention relates to an open-barrel screw press dryer, and more particularly to the use of the water-vaporizing section of such a dryer for chain-branching a copolymer.

Screw press dryers are well known in the art. One such device is an open-barrel screw press dryer described in United States Pat. No. 3,225,453 issued to A. H. Burner which has been found to be particularly valuable for dewatering and drying elastomeric crumb materials. The device consists of a combination of a screw positioned coaxially in a barrel having a plurality of open slots along its length. The device is generally made up of two sections, a dewatering section, and a water-vaporizing section. In the water-vaporizing section, the free volume between screw and barrel, and slot spacing, are generally less than in the dewatering section.

In the dewatering section of the screw press dryer, water is continuously removed by the mechanical action of screw and barrel on a mass of wet elastomer crumb. In the water-vaporizing section, remaining water is evaporated by heating the elastomer mass while conveying the mass through the section. The dewatering and water-vaporizing sections are not always part of the same assembly, but can be separate mechanical assemblies connected, for example, by a conveyor.

It is also known in the art that polymers can be chain-branched by mixing the polymer with a small amount of a promoter, such as a peroxide, and heating the resultant mixture. See for example, Belgian Pat. 740,207 issued Apr. 13, 1970. Such chain-branched polymers have been found to be particularly useful in improving the ozone resistance of vulcanized blends with natural rubber and other elastomers.

Such chain-branching is generally conducted on a roll mill, Banbury mixer, or Brabender Plasticorder. However, use of these devices in existing commercial processes requires the addition of costly processing and conveying equipment with the attendant operating and maintenance costs.

Thus, there has been a need for a more economical device to chain-branch an elastomer with an initiator.

SUMMARY OF THE INVENTION

This invention provides for the use of the water-vaporizing section of an open-barrel screw press dryer for simultaneously drying and chain-branching a copolymer, said use consisting essentially of introducing said copolymer into one end of said dryer, introducing a promoter into said dryer at one or more points on said water-vaporizing section, and heating the resulting mixture while conveying the mixture through said water-vaporizing section, thereby forming a vulcanizable branched elastomeric polymer.

Open-barrel screw press dryers are generally used in commercial processes, therefore, the addition of costly equipment to existing processes is not required to chain-branch elastomers. The successful use of such dryers for chain-branching elastomers is indeed surprising since these devices are designed for the removal of materials from the elastomer, not the addition of chain-branching agents.

BRIEF DESCRIPTION OF THE DRAWING

The FIGURE is a longitudinal cross-section of a screw press dryer used in this invention.

DESCRIPTION OF THE INVENTION

It will be understood that the presence of water is incidental to the process of manufacturing polymers, wherein polymer in the form of crumb is washed with water to remove impurities resulting from its manner of preparation. Ordinarily the crumb as fed to the screw press dryer will contain about from 40 to 60 percent water, and most of it will be occluded so that it cannot simply be drained off. The mechanical action in the dewatering section reduces the water content to about 5 to 12% in the polymer before it goes to the water-vaporization section.

Referring to the FIGURE, a shaft 20, supported at each end by bearings (not shown) carries a feed worm 50 adapted to pick up at the inlet end IE elastomer crumb from a feed hopper, not shown here but illustrated as 12 in FIG. 3 of U.S. Pat. No. 3,225,453, and move it towards the right into an expression chamber or dewatering section where water is mechanically removed from the crumb. Mounted concentrically on shaft 20 to form a screw assembly are a plurality of collars 62 and worm members 65.

The barrel-section is made up of a plurality of longitudinal screen bars, typically of rectangular cross section, spaced apart a few thousandths of an inch to form slots through which water which is squeezed out of the elastomer crumb, can escape. The detail of the slotted-barrel construction is not shown in FIG. 1, but is known to the art, and is illustrated in FIGS. 1 and 3 of Burner U.S. Pat. No. 3,276,354 wherein 55 represents the bars and 56 the spacers. Water escaping through the slotted-barrel is drained away by suitable means (not shown). Referring again to the FIGURE herein, in the barrel are mounted one or more bushings 100, the inner diameters of which are preferably a few thousandths of an inch greater than the worm flights which they surround. Normally this spacing provides running clearance. For example, if some force occurs causing the shaft to deflect, the worm flight affected can run in contact with the annular inner surface of its related bushing, thereby minimizing shaft deflection and consequent wear on the end bearings.

Each barrel or cage section is provided with a center bar 57 at its top and bottom which serves to retain the screen bars in the section. Certain of the center bars are provided with inward-extending lugs 60, sometimes referred to as breaker lugs, opposite collars 62 on the shaft 20. These lugs are adapted to engage the elastomer being forced toward them by the worm flights to prevent rotation of the elastomer along the axial length of the barrel. The elastomeric material is fed toward the discharge end DE, by the action of the screw. Some of the collars 62 are of uniform cross section along their lengths while others are formed to increase in cross section toward the discharge end DE of the barrel, thus forming with the cage walls a passage of decreasing cross section through which the material is forced. This results in mechanical compaction and compression of the material being dried. The compaction forces are increased and directed radially by collars 62. This substantial radial pressure has the effect of forcing any liquid water present through the slots which serve as drainage openings in the barrel.

The worm members 65 are provided with notches or other discontinuities 67 in the worm flights. This notched worm construction enhances the mechanical working of the material being dried.

The portion of the slotted barrel or cage assembly nearest the inlet end IE is referred to herein as the dewatering section, while that closest to the discharge end DE is called the vaporizing section. In the latter, heat is supplied, by means not shown, whereby water not removed in the dewatering section is vaporized and removed as steam. The frictional heat generated by mechanical working and tearing of the material being dried contributes significantly to the total heat available for this drying action.

The free space 1 between the screw assembly and the slotted barrel in the dewatering section substantially exceeds the free space 2 in the vaporizing section.

While the present invention has been described as a single screw-press dryer having separate dewatering and water-vaporizing sections, it will be understood that such sections may be in the form of separate dryers arranged in series so that the dewatered product of the first section passes to the second section wherein water-vaporization occurs.

The dryer is of the open-barrel type, that is, the barrel wall has longitudinal openings or slots therein, adapted to permit water or water vapor to escape, but to retain substantially all of the polymer being dried. Such barrels are already well known in the art, and are sometimes referred to as slotted barrels.

The free volume of the water-vaporizing section of a slotted barrel screw press is calculated by subtracting the volume occupied by the screw from the total volume of the barrel, both volumes being in said water-vaporizing section only. It has been found that the free volume is critical and should be from 8 to 18% of the total volume of the barrel for adequate drying of EPDM polymers and polymers of similar rheological properties. This means that there is relatively close clearance between the screw and the barrel, and as a consequence, the polymer is very tightly squeezed and is subjected to frictional forces normally not attained in screw-press dryers of conventional design. See copending application of Stan G. Smith, Ser. No. 759,727 filed Sept. 13, 1968. An EPDM copolymer is one consisting essentially of ethylene/propylene/and a non-conjugated diene monomer. Such copolymers are well known in the art. Representative dienes are 1,4-hexadiene, dicyclopentadiene, 5-methylene-2-norbornene, 5-ethylidene-2-norbornene and 1,5-cyclooctadiene. The general preparation of such polymers is set forth in U.S. Pat. to Gresham et al., 2,933,480; Tarney, 3,000,866; Gladding et al., 3,063,973, and 3,093,620; Gladding 3,093,621; Adamek et al., 3,211,709; and Natta et al. 3,260,708 and 3,300,459.

This invention is applicable to chain-branching polymers generally. Chain-branching is accomplished by mixing the polymer with a promoter and heating the resultant mixture. See for example Belgian Pat. No. 740,207 issued Apr. 13, 1970. Typical promoters are organic peroxides, sulfur, and sulfur-releasing compounds.

It is preferred to prepare a vulcanizable branched elastomeric polymer having less than about 30 percent insolubles, a Wallace plasticity of about 60 – 100, and an inherent viscosity of at least about 2.3 at less than 30 percent insolubles. This preferred branched polymer is produced by mixing an EPDM copolymer having about 0.1 to 2 gram-moles of carbon-carbon double bonds per kilogram of elastomer and a Wallace plasticity of about 20 to 60 with a promoter, and heating the resultant mixture. Preferred promoters are:

1. about 0.00125 to 0.00780 gram-atoms of sulfur per 100 grams of copolymer,
2. a sulfur-releasing compound yielding about 0.00125 to 0.00780 gram-atoms of sulfur per 100 grams of copolymer, or
3. about 0.0005 to 0.003 gram-equivalents of an organic peroxide per 100 grams of copolymer.

See copending application Ser. No. 25,285 filed Apr. 2, 1970, now abandoned.

The substantially straight-chain EPDM copolymer preferred as the starting material should have a Wallace plasticity of about 20 – 60. The preferred range of Wallace plasticity is about 25 – 45. The EPDM copolymer should have about 0.1 – 2 gram-moles of carbon-carbon double bonds per kilogram of unmodified copolymer. Ethylene/propylene/1,4-hexadiene copolymers are preferred as the starting material in this invention.

The branched copolymers consist essentially of a linear chain or "backbone" with branching along the chain, and have a small amount of cross-linking, but not yet vulcanized and capable of further processing. These branched copolymers differ from previously known copolymers having a practically linear structure. Chain-branching is demonstrated by the fact that the copolymers prepared by this invention have physical properties substantially different than those of practically linear copolymers. The properties of the copolymer used to detect branching are the solution (inherent) viscosity and bulk viscosity as indicated by the Wallace plasticity. For example, the inherent viscosity and Wallace plasticity of a practically linear copolymer and a branched copolymer are measured as described in the following example. The results are compared, and the branched copolymer shows a greater rate fo change in Wallace plasticity with respect to the rate of change in inherent viscosity. Thus, for a given inherent viscosity, the Wallace plasticity is greater for the branched than for the unbranched copolymer.

When branched EPDM copolymers are prepared by this invention, they should preferably have less than 30 percent insolubles as determined by the solubility of the copolymer in $C_2Cl_4$ at 30°C. The Wallace plasticity of the branched EPDM copolymer should preferably be about 60 – 100 with about 60 – 80 being preferred. The inherent viscosity of the branched EPDM copolymer is dependent upon the amount of insolubles in the product. The inherent viscosity should preferably be at least 2.3 at less than 30 percent insolubles as determined by the solubility of the copolymer in $C_2Cl_4$ at 30°C. It will be understood that the insolubles are removed before inherent viscosity is measured.

Promoters useful in this invention are sulfur, sulfur-releasing compounds, and organic peroxides. Mixtures of promoters can also be used for branching copolymers. Accelerators, such as guanidines and thiazoles, can also be used with the promoters.

When sulfur is used to modify an EPDM copolymer, the amount should be about 0.00125 to 0.00780 gram-atoms of sulfur per 100 grams of copolymer. Amounts of sulfur below this range will not yield the required degree of chain-branching, while larger amounts yield a vulcanized copolymer unsuitable for blending with a polyunsaturated rubber. It is not feasible to heat the copolymer with larger amounts of sulfur for a short period of time to obtain chain branching, since it is not possible to terminate the reaction once heating is initiated. The preferred amount of sulfur is about 0.00250 to 0.00625 gram-atoms of sulfur per 100 grams of copolymer. The copolymer and sulfur are heated at a temperature of about 150°C. to 260°C. to induce branching. The preferred temperature range is about 220°C. to 235°C.

A sulfur-releasing compound can also be used to promote chain branching in a copolymer. Useful sulfur-releasing compounds are organic polysulfides generally, preferred compounds being 4,4'-dithiodimorpholine and dipentamethylene thiuram hexasulfide. The amount of the sulfur-releasing compound used depends upon the amount of sulfur in the compound which is released when the compound is heated. For an EPDM copolymer, the amount of the sulfur-releasing compound required is conveniently expressed as an amount which when heated yeilds about 0.00125 to 0.00780 gram-atoms of sulfur per 100 grams of copolymer. It is preferred to use an amount of sulfur-releasing compound yielding about 0.00250 to 0.00625 gram-atoms of sulfur per 100 grams of copolymer. The copolymer and sulfur-releasing compound are heated at a temperature of about 150°C. to 260°C. to effect branching. The preferred temperature is about 220°C. to 235°C.

Organic peroxides and hydroperoxides, generally, can be used as the promoter to introduce chain branching in the copolymer. The organic peroxides are sources of free radicals. Although they are consumed during the reaction producing chain branching, they are not part of the final product. The temperature at which an organic peroxide can be made to decompose into useful free radicals largely determines the application area. The efficiency of a free-radical generator depends primarily upon its thermal decomposition rate at a given temperature and upon the ability of the free-radicals formed to carry out the desired reaction. A convenient means of expressing the rate of decomposition of an organic peroxide at a specified temperature is in terms of its half-life, which is the time required to decompose one-half of the peroxide present. The half-life of an organic peroxide is generally a function of the structure of the peroxide, the temperature, peroxide concentration, and solvent used for the peroxide. As a first approach in finding the best peroxide modifier, one should select the peroxide with half-life characteristics best suited for the conditions of the reaction.

Half-life data can be obtained from decomposition studies of organic peroxides in dilute solutions. Experimental methods and analytical techniques are known to those skilled in the art. A particularly useful reference is D. L. Mageli, S. D. Bukata, and D. J. Bolton, "Evaluation of Organic Peroxides From Half-Life Data," Ludicol Division, Wallace & Tiernan Inc. The thermal decomposition of most peroxides in inert solvents has been shown to follow first order kinetics. Therefore, linear relationships are obtained when the logarithm of the half-life of a particular peroxide is plotted against the reciprocal of the absolute temperature. From this data, the desired peroxide can be selected for particular reaction conditions.

Typical useful organic peroxides are t-butyl peroxypivalate, 2,4-dichlorobenzoly peroxide, decanoly peroxide, propionyl peroxide, benzoyl peroxide, hydroxyheptyl peroxide, cyclohexanone peroxide, 2,5-dimethylhexyl-2,5-di (peroxybenzoate), t-butyl perbenzoate, dicumyl peroxide, 2,5-dimethyl-2,5-di(t-butylperoxy)hexyne-3, 2,5-dimethyl-2,5-di(t-butylperoxy)hexane, 2,5-dimethyl-2,5-di(benzolyperoxy) hexane, di-t-butyl peroxide, p-menthane hydroperoxide, cumene hydroperoxide, 2,5-dimethyl-2,5-di(hydroperoxy)hexane, t-butyl hydroperoxide, and lauroyl peroxide. Preferred organic peroxides are t-butyl perbenzoate, 2,5-di-methyl-2,5-di(t-butylperoxy)hexyen-3, dicumyl peroxide, and 2,5-dimethyl-2, 5-di(t-butylperoxy)hexane.

The preferred amount of peroxide to be used as a promoter for an EPDM copolymer is about 0.0005 to 0.003 gram-equivalents of peroxide per 100 grams of copolymer. The quantity of peroxide chosen within each limit depends on the activity of the peroxide and on the particular EPDM polymer chosen. The limits above are based on the use of pure peroxide. If a peroxide composition is employed which has less than 100 percent active ingredient, e.g., one containing inert filler to aid in weighing, the quantity of this composition will be chosen so that the amount of the peroxide itself falls within the range specified. The half-life of the peroxide used is a function of the temperature at which the heating is conducted. The heating should be conducted for a time and at a temperature such that at least about one half-life of the peroxide lapses. Preferably, heating should be conducted for a time and at a temperature such that at least 3 half-life periods of the peroxide lapse. There is generally no practical reason for operating for more than 10 half-life periods.

It has surprisingly been found that the chain-branching process previously described can be accomplished in the water-vaporizing section of an open-barrel screw press dryer of the type previously described.

Wet elastomer crumb is fed to the inlet end of the water-vaporizing section as previously described. Feed rate of the elastomer crumb is dictated by the capacity of the dryer, but is typically about 3,000–8000 pounds of crumb per hour (on a water-free basis).

A promoter is also introduced into the dryer at one or more points on the water-vaporizing section of the dryer. For example, promoter can be introduced through one or more slots in the barrel normally used for the escape of water. A series of slots along the longitudinal length of the barrel can be used, or a series of slots on the circumference of the barrel can be used. It is preferred that promoter be introduced through one or more holes in one or more cage bars as at 60C, 60D, and 60E in FIG. 1. The holes can easily be formed by drilling the cage bars from the outside surface of the barrel. Feeding promoter through the cage bars in this manner minimizes escape of promoter with water from the dryer.

The water-vaporizing section of the screw-press dryer can be considered as consisting essentially of a plurality of stages. Each stage is made up of a plurality of longitudinal screen bars spaced apart from each other to form slots, and secured in place by breaker bars. When promoter is introduced through one or more holes in one or more breaker bars, it is preferred that the slots on the periphery of the barrel adjacent to the breaker bar be reduced in size up to about 70%, and slots in the next adjacent stage be reduced in size up to 100%. It has been found that this permits a desirable balance between removal of water from elastomer crumb, and minimal loss of promoter with water removed. Referring to FIG. 1, slots around the periphery of the barrel before 60C will preferably be reduced in size up to about 70percent, while slots in the stage between 60C and 60D will be closed up to 100 percent.

Use of the water-vaporizing section according to this invention is an important aspect of this invention. It has been found that promoter cannot conveniently be added to the dewatering section because the promoter tends to be washed out of the dryer before reacting with the elastomer. Such loss of promoter is uneconomical, and presents a health and safety hazard to operating personnel.

Similarly it has been found that promoter cannot be added to the elastomer after the water-vaporizing section without cooling the elastomer. Such cooling would add to the cost of chain-branching the elastomer. Cooling is required since introduction of promoter into hot elastomer woudl result in excessive localized vulcanization and the formation of gel.

Since the rotational speed of the screw required for drying the elastomer is not significantly affected by the chain-branching process, the feed rate of promoter can be easily determined knowing the elastomer feed rate and the amount of promoter required to chain-branch the elastomer. For 100 percent organic peroxide promoters, the feed rate is typically about 6–16 lb./hr. Typically, the residence time for drying is less than two minutes, and the time to react copolymer with promoter is typically about 10–20 sec.

It is preferred to introduce the promoter into the dryer in a solution of a naphthenic processing oil of the type commonly used in rubber processing. When a peroxide promoter is used, the solution typically contains at least about 5 percent peroxide based on the weight of peroxide plus oil. A preferred solution contains about 10–20 weight percent peroxide.

The promoter and elastomer are heated to the temperatures previously stated while passing through the dryer. Since heat is added to the water-vaporizing section to evaporate residual water in the elastomer, the same heat addition means can be used to effect chain-branching. For example, steam can be added to the water-vaporizing section, or in some cases the mechanical action of the screw in the barrel will generate sufficient heat. The water-vaporizing section of the screw-press dryer has a temperature profile increasing from the inlet to outlet of the section. This profile can be altered to obtain the proper temperature for the chain-branching reaction as the art skilled will recognize.

The branched-chain copolymers have been found to be especially useful in blends with polyunsaturated elastomers such as natural rubber and the synthetic diene elastomers. It is known in the art that the EPDM elastomers confer a measure of ozone resistance on such blends, but the branched-chain copolymers are much more effective. The blends can be processed using conventional rubber processing equipment. The copolymers are only useful in blends if chain-branched prior to blending with other elastomers. It is not possible, for instance, to obtain the superior ozone resistant blends by mixing an unbranched copolymer with a promoter, and natural rubber, and subsequently heating the mixture. About 10 to 50 parts by weight of the branched copolymer can be blended with 90 to 50 parts by weight of a polyunsaturated elastomer. The preferred ratio is 10 to 30 parts by weight of branched copolymer to 90 to 70 parts by weight of at least one conjugated diene elastomer, such as, natural rubber, styrene/butadiene, 1,4-polyisoprene, and neoprene.

The branched copolymers are generally cured after the chain-branching process. Various curing systems for the branched copolymers or blends can be employed, as will be apparent to thos skilled in the art. The most important of these curing systems are the sulfur curing system and peroxide curing system.

This invention is further illustrated by the following example. All parts, percentages, and proportions are by weight unless otherwise indicated. As used herein, the term "phr" means parts of the specified ingredient per 100 parts of copolymer.

EXAMPLE

This example describes the use of a screw-press dryer to chain-branch an EPDM copolymer. In this example, a shaft configuration is employed in the second of two screw presses of the open barrel type operating in series, which limits the free volume between the screw and the barrel of the water-vaporizing section to 18percent of the available free barrel volume.

An ethylene/propylene/1,4-hexadiene copolymer crumb having about 0.2–0.4 gram-moles of C═C per Kg. of copolymer, a Wallace plasticity of about 30, an inherent viscosity of about 2.4, and less than 30 percent insolubles as determined by solubility in $C_2Cl_4$ at about 25°C., is fed at a rate of about 4,650 lb./hr. to the first screw press. The elastomer crumb containing about 50 percent water is dewatered in the first screw press to 5 to 20 percent residual moisture by squeezing the crumb between the shaft and barrel. The second screw press receives the partially dewatered crumb and provides additional squeezing to remove all the expressible (to 5–10 percent residual) water. It then heats the elastomer above 150°C. to vaporize the remaining water. Water is exhausted through the barrel of the first screw press, and water and steam are exhausted through the barrel of the second screw press. In this example the vaporizing section of the second machine consists of the last five sections (55 inches) of an eight section (88 inch) screw press.

In the vaporizing section of the second press, the screw configuration is composed of 12- and 12⅛-inch drum diameter plain and notched worms of conventional design with 13 ⅞-inch flight diameters, 12-inch diameter collars, and 12 ½-inch to 13 ¼-inch diameter rising collars arranged to restrict the free volume to 18 percent of the available volume in a 14-inch diameter barrel.

In this example the rising collars are used in the collar positions immediately prior to the press discharge to reduce the free volume and apply additional mechanical work to the polymer. The number, position, and dimensions of these rising collars can be varied as long as the free volume is maintained between 8 and 18 percent of the available barrel volume. Worm pitch of 3 inches is used exclusively in the vaporizing section, although minor variations in this dimension would function satisfactorily. Screw length devoted to collars amounts to 40 percent of the total length in the vaporizing section. This invention functions satisfactorily with 35percent to 50 percent of the shaft length devoted to collars. Breaker bars are used.

A 10 percent solution of t-butyl perbenzoate in light naphthenic processing oil (SUS viscosities 2,825 and 87.2 at 37.8°C. and 98.9°C. respectively; viscosity-gravity constant, 0.889) is prepared in an agitated stainless steel storage tank. The solution is metered by means of a gear pump and differential pressure instrumentation to three points in the water vaporizing section of the screw press previously described. The points of introduction of the peroxide are similar to 60C, 60D and 60E in the attached Figure. An average peroxide concentration of 0.20 percent in the polymer is maintained to effect the desired chain-branching (Wallace plasticity of 65–75). Use of oil for dilution of the peroxide results in a 1.8 phr oil content in the polymer. Promoter feed rate is about 15–18 gal./hr.

Dryer cage construction at the points of introduction of the peroxide-oil solution is modified by reducing cage bar gapping from 0.010 inch to 0.003 inch (e.g., before 60C), and closing entirely the cage bar gapping in the next adjacent stage (e.g., between 60C and 60D). Little or no leakage of promoter is observed during operation.

Chain-branching of the EPDM copolymer with t-butyl perbenzoate is readily accomplished in one minute of dryer residence time available between the peroxide addition points and dryer discharge. Control of polymer viscosity is maintained by adjusting the speed of the peroxide solution gear pump, and by making minor changes in polymer feed rate.

The temperature in the water-vaporizing section varies between 175°–218°C. It is operated within a goal discharge temperature range of 190–210°C. More than 1 half-life of the peroxide lapses.

About 92 percent of the chain-branched EPDM meets the residual moisture specification of 0.80 percent or less. About 83 percent of the EPDM meets the Wallace plasticity specification of 65–75, with an inherent viscosity of at least 2.3 and less than 30 percent insolubles.

Mooney viscosity is measured at 121°C. in accordance with ASTM Method D-1646-67 using the large rotor. After the sample has been warmed in the machine for one minute, the shearing disc viscometer motor is started to begin the test. Four minutes later the reported viscosity reading is taken.

Wallace Plasticity is a measure of the amount of flow or deformation of unvulcanized elastomeric materials under load. The sample to be tested is sheeted and cut into pellets having a thickness in the range 3.18–6.35 mm (0.125–0.300 inch). The test is performed with a Wallace Plastimeter manufactured by H. W. Wallace and Co., Ltd., London. During a 10-second period the pellet is simultaneously compressed to exactly 1.0 mm in thickness and heated to 100°C., the resulting test piece is then subjected to a 10-kg load for exactly 15 seconds at 100°C. The final thickness of the test piece, expressed in units of 0.01 mm, is the plasticity value reported. The standard 1-cm diameter platen is suitable for pellets of average hardness. Proper platen temperature regulation is most important becasue elastomer plasticity is usually temperature dependent. Plasticity readings should normally fall between 20 and 90 on the scale for most reliable readings. In this test, insolubles are not removed as they are in the measurement of inherent viscosity.

Inherent viscosity is determined by solubilizing 0.1 grams of copolymer in 100 ml. of $C_2Cl_4$ in a shaker tube. The tube is shaked at room temperature (about 25°C.) for about 3 hours. The contents of the tube are passed through a soxhlet thimble-type strainer to remove insolubles. The inherent viscosity of the strained solution is then determined at room temperature.

I claim:

1. The use of the water-vaporizing section of an open-barrel screw press dryer for simultaneously drying and chain-branching an elastomeric EPDM copolymer having about 0.1 – 2 gram-moles of carbon-carbon double bonds per kilogram of copolymer, said use consisting essentially of introducing said copolymer into one end of said dryer, introducing as a chain-branching promoter at least one of 1. about 0.00125 gram-atoms of sulfur per 100 grams of copolymer,
2. a sulfur-releasing compound yielding about 0.00125 to 0.00780 gram-atoms of sulfur per 100 grams of copolymer, or
3. about 0.0005 to 0.003 gram-equivalents of an organic peroxide per 100 grams of copolymer into said water-vaporizing section at one or more points on said barrel, and heating the resulting mixture while conveying the mixture through said water-vaporizing section, thereby forming a vulcanizable branched elastomeric polymer.

2. The use of the open-barrel screw press dryer of claim 1 wherein said chain-branching is an organic peroxide.

3. The use of the open-barrel screw press dryer of claim 2 wherein said dryer consists essentially of a screw positioned coaxially within a slotted barrel, and volumes of the screw and barrel are so proportioned that free volume between the screw and barrel is about 8-18 percent of total available barrel volume.

4. The use of an open-barrel screw press dryer of claim 3 wherein said EPDM copolymer introduced to said dryer is a copolymer of ethylene, propylene, and at least one of 1,4-hexadiene, dicyclopentadiene, 5-methylene-2-norbornene, 5-ethylidene-2-norbornene, and 1,5-cyclooctadiene.

5. The use of an open-barrel screw press dryer of claim 4 wherein said EPDM copolymer has a Wallace plasticity of about 20–60.

6. The use of an open-barrel screw press dryer of claim 5 wherein said EPDM is a copolymer of ethylene, propylene, and 1,4-hexadiene having a Wallace plasticity of about 25–45.

7. The use of the open-barrel screw press dryer of claim 6 wherein the mixture is heated for a time and at a temperature such that at least about 1 half-life of the peroxide lapses.

8. The use of the open-barrel screw press dryer of claim 7 wherein the peroxide is t-butyl perbenzoate, 2,5-dimethyl-2,5-di(t-butylperoxy)hexane, or 2,5-dimethyl-2,5-di(t-butylperoxy)hexyne-3.

9. The use of the open-barrel screw press dryer of claim 8 wherein the peroxide is in about a 10–20 weight percent solution of a naphthenic processing oil.

10. The use of the open-barrel screw press dryer of claim 9 wherein the dryer consists essentially of a plurality of stages, each stage made up of a plurality of longitudinal screen bars spaced apart to form slots and secured by breaker bars, wherein the slots of one stage are reduced in size up to 100 percent, the slots of an adjacent stage are reduced about 70 percent in size, and promoter is introduced through one or more holes in one or more breaker bars adjacent to the slots.

11. The use of the open-barrel screw press dryer of claim 10 wherein the screw has a diameter at the polymer discharge end larger than at the polymer inlet end of said dryer.

12. The use of the open-barrel screw press dryer of claim 11 wherein the water-vaporizing section is immediately preceded by a dewatering section having a greater proportion of free volume to total available volume than does said water-vaporizing section.

13. The use of the open-barrel screw press dryer of claim 12 wherein the vlucanizable branched elastomeric polymer has less than about 30 percent insolubles, a Wallace plasticity of about 60–80, and an inherent viscosity of at least about 2.3 at less than 30 percent insolubles.

* * * * *